Oct. 13, 1953    N. G. SCHREINER ET AL    2,655,586
MULTIPLE ELECTRODE POLYPHASE ARC WELDING
Filed March 7, 1950    2 Sheets-Sheet 1
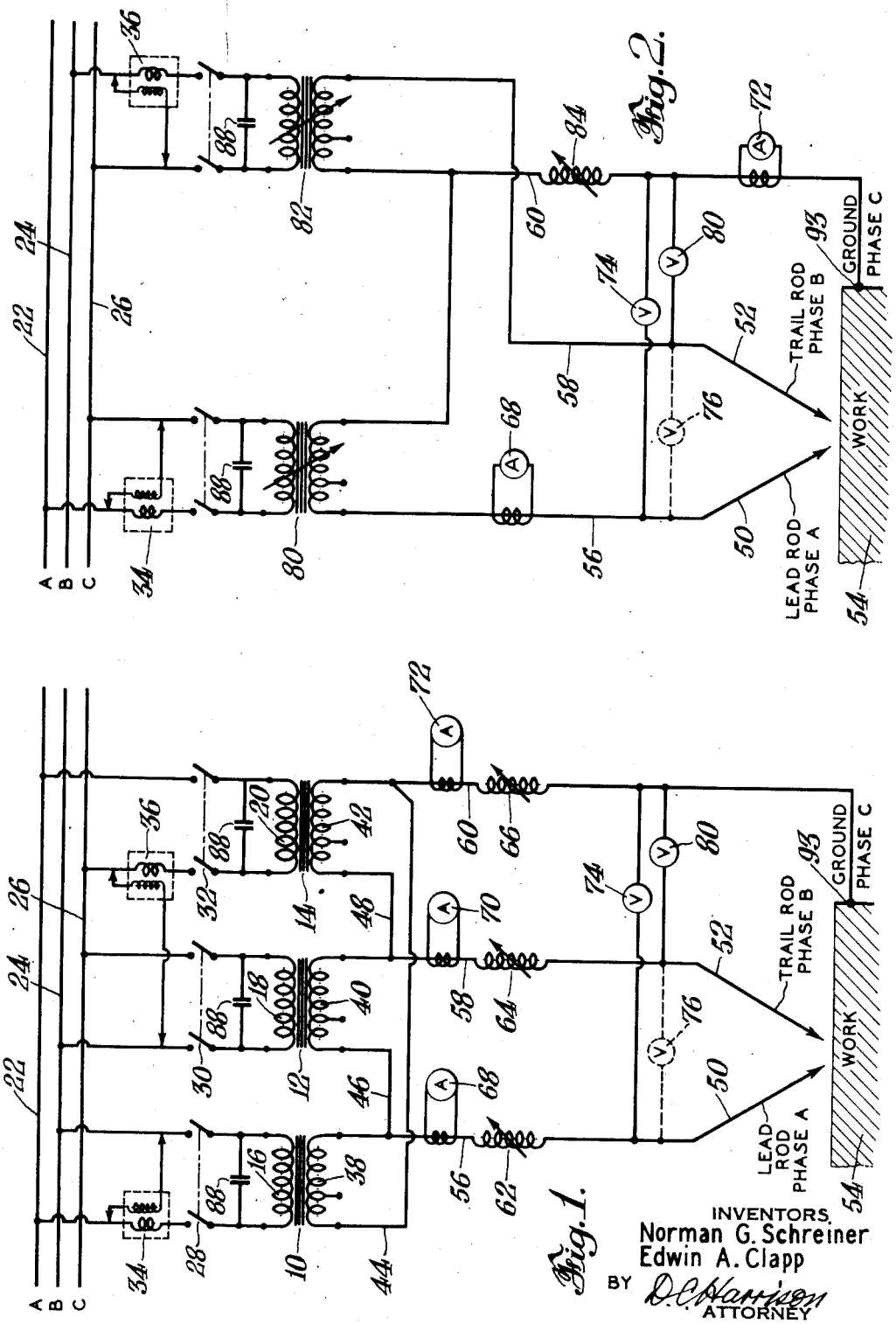

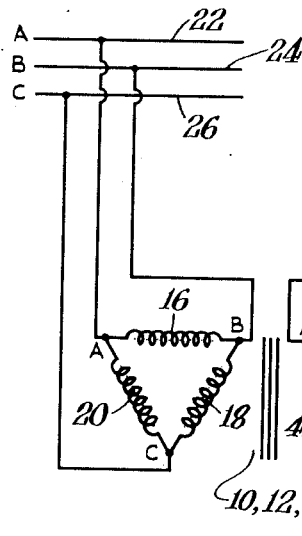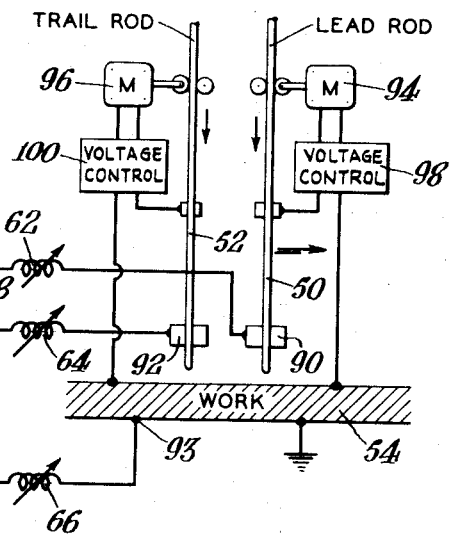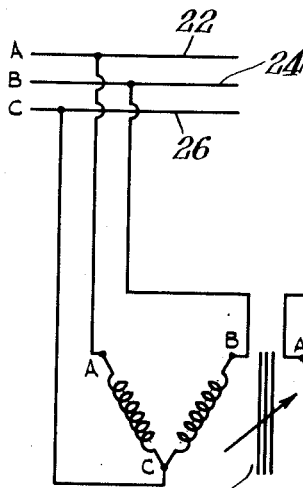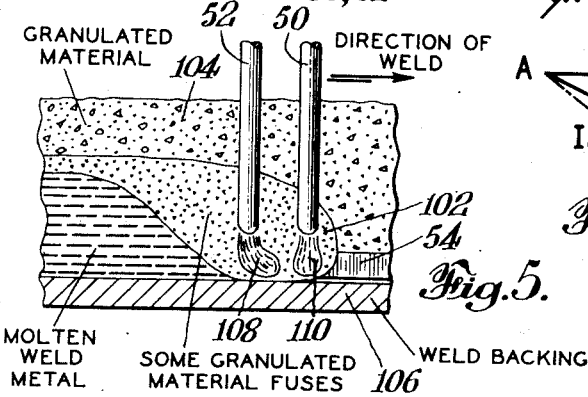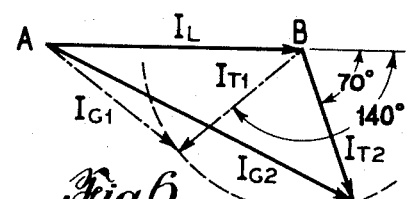

Patented Oct. 13, 1953

2,655,586

UNITED STATES PATENT OFFICE 2,655,586

MULTIPLE ELECTRODE POLYPHASE ARC WELDING

Norman G. Schreiner, Philadelphia, Pa., and Edwin A. Clapp, Niagara Falls, N. Y., assignors, by mesne assignments, to Union Carbide and Carbon Corporation, a corporation of New York Application March 7, 1950, Serial No. 148,114

7 Claims. (Cl. 219—10)

This invention relates to multiple electrode polyphase arc welding, and more particularly to tandem welding with at least two rods of metal which are simultaneously fed into a common pool of weld metal while conducting phase-spaced alternating currents supplied by a single source of three-phase power. While the invention is well suited for submerged-melt welding under a blanket of granular flux, it is not restricted thereto, but is also suitable for inert gas shielded welding, as well as "open-arc" welding.

In tandem welding, i. e., wherein a number of metallic welding rods are fed into a common pool of weld metal and follow one another along the same seam or joint, it has already been proposed to energize such rods by supplying direct current to two rods, or alternating current to two or three rods, or alternating current to one rod and direct current to another rod. Such prior proposals, however, are subject to difficulties and disadvantages some of which are set forth below.

When the necessary direct current for welding is furnished by a motor-generator set, the equipment selection, control and maintenance are difficult, because of the heavy welding current required, and the almost continous duty cycle of the usual tandem welding set-up. However, the principal disadvantage of direct current supplied through two rods is the susceptibility of the weld zone to magnetic disturbance (arc blow). This can be counteracted somewhat by suppling alternating rather than direct current to one rod, preferably the trailing rod. It can be practically eliminated by supplying polyphase alternating current to all of the rods.

When the rods are supplied with three-phase welding current by a transformer secondary welding circuit Y-connected to produce either 60° or 120° phase relationship between three welding arcs, as heretofore proposed, arc blow in the weld zone is minimized, but the arcs vibrate toward and away from one another in the direction of the welding path with a predominantly trailing component. For better and faster welding, however, the predominant component of at least one arc should be leading, i. e., arcing ahead or in advance of the weld zone. Such Y-connected system is also subject to undesirably high sensitivity to variations in primary voltage and harmonics, and the lack of a single control by means of which the degree of penetration can be adjusted. Furthermore, the phase differences between the three arcs are uniform (equal), i. e., in either 60° or 120° phase-spaced relationship at all times, which restricts the scope of usefulness thereof. Furthermore, star connections are generally undesirable because of the primary voltage requirements and secondary voltage output made necessary by available welding transformer equipment.

Another problem in arc welding is control of the direction taken by the arc stream when influenced by surrounding magnetic fields. Various proposals for controlling this phenomenon for a single electrode are known. It has been proposed also to use an alternating current arc following a direct current arc for control of the direct current arc. However, in such case the weld zone was disturbed by surrounding magnetic conditions to such an extent that the operation could not be stabilized.

Another problem connected with the use of alternating current for single electrode welding is the difficulty of obtaining satisfactory welds at as high speeds as are possible with direct current. This is due to the extinguishment of the arc at the end of each alternation and the necessity for reignition. During the time required to accomplish these phenomena, a considerable length of joint will be traversed when the welding speed is relatively high. The weld will, therefore, be irregular in external contour and fusion pattern. Another factor is the mechanical deflection of the arc which apparently occurs to an increasing degree as the welding speed is increased, the deflection eventually reaching a degree resulting in unsatisfactory weld surfaces.

Therefore, the main object of this invention is to provide an improved multiple electrode polyphase arc welding process which overcomes difficulties and disadvantages of the prior art, and is relatively faster, simpler and more efficient. Other objects are to reduce the number of electrodes or rods, and to provide a simple control by means of which the operation can be readily and quickly adjusted, so that the resulting weld penetration and shape are improved in depth and contour, and the operation is more stable than was possible in the past. Other objects will appear in the following description.

According to the invention there is provided a novel multiple electrode polyphase arc welding process which comprises tandem welding with at least two metallic electrodes or rods which are simultaneously fed into a common pool of weld metal by individual automatically controlled rod-feed motors. Such motors are separately controlled by individual arc-voltage responsive circuits, so that the arc voltage of each rod is maintained substantially constant automatically by corrective changes in the rod feed-rate of the corresponding rod-feed motor when the arc voltage tends to depart from a predetermined value. At least two welding transformers energize the arc welding operation by having their primary windings connected to a three-phase source of supply. The secondary windings are connected to the welding rods and the work, respectively, through suitable lead circuits, at least one of which contains an adjustable impedance, to produce a predetermined magnitude and phase sequence of the welding arcs.

More particularly, according to the invention, alternating current from a single three-phase source is supplied to the primaries of welding transformers in closed-delta or open-delta connection. The transformer secondaries are likewise connected in closed-delta or open-delta. Two lead lines go to the electrodes, while a third or ground lead line goes to the workpiece. A variable reactor is connected in series with at least the work-lead line. Connections are made so that the phase rotation at the welding zone is normal; i. e., if the lead-rod current is considered A-phase, trail-rod current should be B-phase, and the work or ground-lead current will then be C-phase. An individual arc-voltage control is used to feed each rod, since it is desirable to be able to adjust both welding voltage and current on each electrode individually. The variable reactor in the ground or work lead-line makes an exact setting of the current in that circuit possible.

The variable reactance in the work lead thus provides means for adjusting the phase angle between the lead and trail rod currents, as well as the magnitude of the work lead current, so that the trailing arc is caused to vibrate more toward a leading position in the direction of welding regardless of external conditions which would otherwise influence the arc. As a result, the speed of welding is increased by at least 100% over prior alternating current set-ups.

Electrically, the new system has many advantages, some of which are relative insensitivity to primary voltage variations, practically balanced line loads at high power-factor, and high efficiency of current transformation with practically no no-load losses. From a maintenance standpoint, the transformers require practically no maintenance compared to that of a motor-generator set operating under usual welding shop conditions. From a welding standpoint, welds are produced at substantially higher speeds, of good bead shape, and with absence of undercutting; a constant, readily controllable welding current supply being provided. To a great extent "arc blow" and the problems involved in controlling its effect are overcome. The control of current in the ground circuit, provided by the variable reactor, permits further control of weld penetration and shape not heretofore provided. Other advantages are, more accurate control of penetration, increased efficiency as measured by the ability to complete a joint, and the ability to attain satisfactory welds at higher speeds than possible with previously known methods.

Either the closed-delta or V (open delta) connection is recommended, the advantage of the delta connection being in the independent control of the ground current by which the degree of penetration can be varied, the lack of sensitivity of this system to variations in primary voltage and the suppression of harmonics. Independent control of the ground current in the open-delta connection is obtained by using an adjustable reactor in the ground lead. The delta connections are especially recommended for pipe welding, where accurate control is desirable.

In the drawings:

Figs. 1 and 3 are circuit diagrams of a closed-delta connected three-transformer system illustrating the invention;

Figs. 2 and 4 are circuit diagrams of an open-delta connected two-transformer modification;

Fig. 5 is a fragmentary cross-sectional view of the welding zone; and

Fig. 6 is a topographical vector diagram of the welding currents.

As shown in Fig. 1, three welding transformers 10, 12 and 14 have their primary windings 16, 18 and 20 connected in closed-delta to conductors 22, 24 and 26 of a three-phase alternating current supply line by input circuits including switches 28, 30 and 32. Wattmeters 34 and 36 may be connected in such input circuits to measure the power supplied to the system. The secondary windings 38, 40 and 42 of the transformers are connected together in closed-delta by conductors 44, 46 and 48, and to welding rods 50 and 52, and the work 54 by suitable lead circuits 56, 58 and 60, respectively, provided with adjustable current control means such as variable reactors 62, 64 and 66, and ammeters 68, 70 and 72. Voltmeters 74, 76 and 80 also may be connected across the circuits 56, 58 and 60.

It will be noted that the current control reactors are in the lead lines which makes it possible to use welding transformers where the output is controlled by a series reactor separated from the transformer winding. Welding transformers with built-in reactors are suitable since the necessary tap between the secondary winding and the reactor can be easily made. It should be noted that, although standard welding transformers can be used, which make available to the lines, power equal to 1.73 times their individual rating, that this is generally not available because the minimum impedance built into the adjustable reactors is about twice that required. This can be reduced to proper values by tapping the reactor winding at approximately the midpoint, or by using shunt reactors which should be roughly adjustable, the finer adjustments being made by the built-in units.

As shown in Fig. 4, only two transformers 80 and 82 are connected in open-delta or V to the three-phase power supply line and to the electrodes and work. This circuit is made comparable in performance to the closed-delta circuit by the use of an adjustable reactor 84 in the work or ground line. Separate reactors for welding current control are available from the major equipment manufacturers, and makes the use of welding transformers, whose secondary output is controlled by the magnetic coupling of the windings, practical.

Capacitors 88 in parallel with the primary windings are recommended to practically balance the line loads and increase the power factor. Capacitors in the primary line are desirable, since they can be used to practically balance the phase load at any given operating level, thus reducing the phase unbalance as well as increasing the overall power factor. The adjustment is reasonably simple, since capacitors are generally supplied in 15 kva. or smaller units.

The preferred phase sequence and the phasing should be observed, i. e., in no case reversed. Incorrect connections will result in damage to the transformers or unstable welding conditions and undesirable welds.

As shown in Fig. 3, which includes a simplified circuit diagram of the supply circuit, the lead lines 56, 58 and 60 go to the lead rod 50, the trail rod 52, and the work 54, respectively, by way of conventional nozzles 90 and 92, and ground or work connection 93. The rods 50 and 52 are fed toward the work 54 by rod-feed motors 94 and 96 which are regulated by voltage controls 98 and 100, respectively, in accordance with the arc voltage between each rod and the work, so that the rod feed automatically maintains each arc voltage substantially constant in a manner well-known to those skilled in the art. The welding head with which the rods are associated, is moved in the direction of the arrow at a constant speed.

As shown in Fig. 5, the rods 50 and 52 are fed into a common pool 102 of weld metal and flux, under a blanket 104 of granulated material disposed on the work 54 having a backing 106 located under the welding seam. The welding currents are adjusted by means of the reactors in the lead lines, so that the trailing arc 108 and the leading arc 110 vibrate in the direction of the weld with a predominantly leading component. This is illustrated by the forward inclination of the trailing arc 108.

As shown in Fig. 6, changing the ground or work current in the lead line 60 by adjusting the reactor 66, from a value of $I_{G1}$ to $I_{G2}$, changes the phase-angle between the lead-arc current $I_L$ and the trail-arc current $I_{T1}$, $I_{T2}$ from 140° to 70°. It is within that range of adjustment where the value of phase angle is between approximately 60° and 140° that the welding arcs have a predominantly leading component.

Typical conditions used for tandem electrode single pass butt welds using polyphase current against a copper backing are shown in Table I.

TABLE I

| Thickness | Lead rod, amps. | Trail rod, amps. | Ground, amps. | Speed, in./min. I. P. M. | Rod spacing, inches |
|---|---|---|---|---|---|
| 14 ga | 400 | 420 | 450 | 190 | ½ |
| ¼″ | 1,050 | 675 | 1,075 | 68 | ⅞ |
| ½″ | 1,000 | 860 | 1,140 | 43 | 1⅛ |
| 1″ | 1,600 | 1,680 | 1,740 | 30.5 | 2 |

For comparison, welding conditions normally used for single electrode alternating current butt welds of the same type are shown in Table II.

TABLE II

| Thickness | Amps. | Volts | Speed, I. P. M. |
|---|---|---|---|
| 14 ga | 350 | 24 | 65 |
| ¼″ | 650 | 32 | 28 |
| ½″ | 850 | 28 | 16 |
| 1″ | 1,550 | 41 | 11 |

It is known that the welding arc is effected by internal magnetic forces, the predominating field being the self-induced field produced by the welding current. This is affected by (1) the change in the direction of current flow as it enters the work and is conducted away toward the ground connection, (2) the asymmetric arrangement of magnetic material around the arc, and (3) in alternating current welding, the fields produced by the eddy currents in the material being welded. The arc is further effected by the drag produced by the travel motion. In tandem arc welding, the self-induced fields surrounding each electrode react with each other in addition to being acted upon by the factors noted above.

The field surrounding a rod supplied with alternating current varies proportionately to it as it varies from a maximum positive value to a maximum negative value. If the alternating currents supplied to each rod are spaced as to phase, then the current flow in each rod at some parts of the cycle will be in opposite directions, causing the field between the rods to be reinforced, while in other parts of the cycle the current flows will be in the same direction, causing the field between the rods to be diminished. In either case, the respective arc discharges will move in the direction of the weaker field. It can be seen that by varying the phase spacing between the currents that the arc discharges may be made predominantly attractive, repulsive or of equal magnitude, and that the frequency of the oscillation will always be twice that of the applied current.

If welding current is supplied from a single polyphase source, the phase spacing between the currents at the welding zone will vary depending upon the magnitude of the current in each leg. The only method of maintaining a uniform phase difference of less than 180° between the arcs, or a uniform phase spacing of 60° or 120° is by having the current flow in each arc of the same magnitude. This requirement, while giving a balanced load, limits the operational capabilities. If, in addition to varying the currents in the electrode, the current in the ground leg is varied independently by means of the variable series reactor, any phase spacing between the electrode currents that may be desired can be obtained. Thus not only the magnitude of the magnetic forces, but also the ratio of time between repulsion and attraction of the arcs can be controlled.

The ground current, whose magnitude is thus varied, sets up a field which reacts with the self-induced field of the rods. The time sequence in which these fields perform is determined by the phase rotation of the currents at the welding zone. So far we have found that normal phase rotation produces much more satisfactory welds than reversed phase rotation.

Output of the secondaries of three standard welding transformers, connected in closed-delta, whose primary windings were also connected in closed-delta to a single three-phase line, was supplied in suitable phase sequence to each of two metal welding electrodes in tandem and the workpiece through leads containing adjustable series reactors, for the submerged-melt welding of the longitudinal seam of a ¼″ wall steel plate 20″ diameter pipe. This system displaced a motor generator and single-phase welding transformer which had been used to supply direct current to the leading electrode and alternating current to the trailing electrode. An increase of at least 40% in welding speed with more complete control of weld quality and welding conditions resulted.

A definite weld result in a given joint detail requires a power input proportional to the speed at which the weld is made. Tandem welds can be made in any thickness at extremely high speed provided this power is available and the speed of progression is uniformly maintained. For single pass welds where complete penetration is desired, the depth of penetration is equivalent to the plate thickness. For double-V butt welds the depth of penetration is the thickness of the weld nugget minus the reinforcing. The power is divided between the lead and trail rod in various ways depending on the type of weld required, although the empirical division of power which will be described is not always adhered to as will be noted by a study of Tables I and III which give typical welding conditions for various thicknesses of plate and joint types.

TABLE III

[A. C.-A. C. tandem welding conditions for butt welds. Double welded butt joints.]

| Thickness | Lead rod, amps. | | Trail rod, amps. | | Ground, amps. | | Speed, I. P. M. | |
|---|---|---|---|---|---|---|---|---|
| | Backing | Finish | Backing | Finish | Backing | Finish | Backing | Finish |
| ¼" | 940 | 690 | 1,000 | 600 | 1,200 | 640 | 85 | 82 |
| 1" | 920 | 1,000 | 860 | 1,160 | 980 | 1,140 | 30.7 | 30.4 |
| 1 9/16" | 1,020 | 1,360 | 1,420 | 1,480 | 1,420 | 1,400 | 22.4 | 23 |
| 2" | 1,440 | 1,740 | 1,480 | 1,760 | 1,540 | 1,920 | 17.5 | 17.5 |

The above table is based on the following edge preparation: for ¼" thickness—backing V 0—root face ¼"—finishing V 0; for 1" thickness—backing V 80° x 5/16"—root face 3/8"—finishing V 80° x 5/16"; for 1 9/16" thickness—backing V 70° x 7/16"—root face 5/8"—finishing V 70° x ½"; for 2" thickness—backing V 60° x 11/16"—root face 5/8"—finishing V 70° x 11/16".

For single pass copper backed butt welds with complete penetration of weld, the magnitude of the current in the leading rod must be sufficient to insure complete penetration and formation of the bottom. The current in the trail rod should only be sufficient to add the desired amount of metal to form the reinforcing and is generally about 65% of that on the lead rod. The magnitude of the ground current is adjusted by means of the variable reactor to produce a phase angle between the leading and trailing rod of preferably from 107 to 120° if the values of the lead, trail and ground currents are used to plot a vector triangle. Too little ground current will prevent complete penetration; too much, a slaggy (or wet) bottom which will be undercut. A ground current of the same or slightly greater magnitude as the lead rod current will normally produce metallic bottom beads free of slag.

In double-welded butt joints, the power in the leading arc will generally be approximately 45% of the total power required. A current ratio between lead, trail and ground will ordinarily be 1:1.10:1.20 respectively. From these values, the welding conditions for any speed and depth of penetration required may be calculated.

An important factor is the distance between rod centers, usually measured at the face of the joint. The spacing may generally be greater when high welding currents and slow speeds are used. On light work welded at high speed, the closest rod spacing that can be obtained without causing interference is desirable. Such interference is indicated by unstable current and voltage and by rough, undercut weld reinforcement. Spacing just a little greater than the minimum will produce the flattest and smoothest weld reinforcement. Increasing the spacing from this dimension will narrow and roughen the reinforcement slightly. Desirable spacings are shown in Table I and may be considered characteristic for the welding speeds listed.

Of equal importance is the alignment of each rod with respect to the center line of the joint. Misalignment of either rod may cause an unsymmetrical and rough reinforcement, while misalignment of the leading rod will cause irregular penetration. Misalignment due to nozzle wear and rod weave can be minimized by operating the nozzles as close to the work as possible, 1½ to 2" being acceptable, the lesser distance being used for the smaller welds.

The rods may be positioned parallel to each other, but are generally operated at a slight angle to each other because of mechanical convenience. We have not found that the angle from the vertical of either rod is particularly critical, having made successful welds with both rods vertical, both rods at an angle to the vertical, and both possible combinations of one rod vertical and one rod at an angle. Parallel positioning is generally required where there is an uncompensatable variation in the distance between the work and the contact jaws; in some cases the parallel rods have been in the forehand direction, dragging the weld.

The rod diameters are determined by the ordinary current densities associated with submerged-melt welding, that is from approximately 20,000 to 50,000 amperes per square inch. Ordinarily the lead and trail rods are of the same diameter, but for single pass welding there seems to be some advantage if the lead rod is one size larger than the trail rod (¼ and 7/16" diameter, respectively).

The edges of the seam are generally square up to approximately 7/16" in plate thickness, while in greater plate thicknesses single V or double V preparations are used. The chief modification necessary in edge preparation is an increase in root face dimension of approximately 25%.

While it is ordinarily desirable to weld away from the ground connection, the use of alternating current on each rod with the transformer secondaries in a three-phase system, according to the invention, practically eliminates any troubles from "arc blow." The location of the ground connection is not critical; this is especially true since the ground current can be controlled by the variable reactor.

There is little or no evidence that the importance of other factors which are critical to the performance of automatic welding are minimized by submerged-melt welding, according to the invention. Among these are: cleanliness of the joint, uniformity of fitup and uniformity of welding speed. Variations in primary voltage can be tolerated to a greater extent than in the single phase connection, since variations in any one phase of the primary will only partially effect the secondary output of the delta connection.

We claim:

1. The method of electric arc welding metal work which comprises maintaining at least two metal fusing and metal depositing electric arcs in tandem in a common weld zone on the work, energizing such arcs from a single three-phase power source through leads containing variable reactance means, independently and continuously supplying weld metal to each arc as metal is fused thereby, coordinating relative movement between said arcs and the work with the rate of fusion, independently controlling the voltage of each arc to maintain each arc voltage at a predetermined substantially constant value, and by varying said reactance means maintaining a phase angle of less than 140° and more than 60° between the arc currents, to vibrate at least the trailing arc with a predominantly leading component in the direction of the weld.

2. A multiple electrode polyphase arc welding process which comprises feeding two welding rods of metal automatically in accordance with the demands of individual welding arc voltage controls, toward a common pool of weld metal which progresses along the seam to be welded in a workpiece of metal, as the rods and such workpiece are relatively moved in the direction of the seam so that such rods are in tandem with each other, energizing the welding operation with alternating current derived from a single source of three-phase power, supplied to such rods and the workpiece, respectively, through separate lead circuits each of which contains a reactance, the phase relationship of the arc welding currents being such that the lead-rod current leads the trail-rod current which in turn leads the ground current, by phase angles which are unequal, and by maintaining the relative phase angles and magnitudes of the alternating currents, depending upon the relative reactances in the lead circuits, vibrating at least one of the welding arcs in the direction of the welding seam with a predominantly leading component.

3. The method of operating electric arc welding apparatus having two relatively movable metal fusing and depositing electrodes feeding in tandem into a common weld zone on a workpiece, wherein said electrodes and workpiece are energized by a single three-phase power source supplied to said electrodes and said workpiece respectively through separate lead circuits containing means for varying the relative value of reactance in said lead circuits; comprising: striking an arc between each of said electrodes and said workpiece to provide leading and trailing arcs; varying the relative value of reactance in said lead circuits to obtain an adjustment at which the magnitude of and phase angle between the leading and trailing arcs is such to provide a trailing arc having the optimum predominately leading position in the direction of the weld over the greatest portion of the trailing arc current cycle; independently and continuously supplying weld metal to each of said arcs as metal is fused thereby; coordinating relative movement between said arcs and the workpiece with the rate of fusion; and independently controlling the voltage of each of said arcs to maintain each of said arc voltages at a predetermined substantially constant value.

4. The method of operating electric arc welding apparatus having two relatively movable metal fusing and depositing electrodes feeding in tandem into a common weld zone on a workpiece, wherein said electrodes and workpiece are energized by a single three-phase power source supplied to said electrodes and said workpiece respectively through separate lead circuits containing means for varying the relative value of reactance in said lead circuits; comprising; striking an arc between each of said electrodes and said workpiece to provide leading and trailing arcs; varying the relative value of reactance in said lead circuits to provide an adjustment at which the leading arc current leads the trailing arc current by that angle, less than 140° and more than 60°, at which said trailing arc has a predominately leading position in the direction of the weld over the greatest portion of the trailing arc current cycle; independently and continuously supplying weld metal to each of said arcs as metal is fused thereby; coordinating relative movement between said arcs and the workpiece with the rate of fusion; and independently controlling the voltage of each of said arcs to maintain each of said arc voltages at a predetermined substantially constant value.

5. In the method of electric arc welding metal work employing two relatively movable metal fusing and depositing electrodes feeding in tandem into a common weld zone on the work, wherein said electrodes and work are energized by a single three-phase power source supplied to said electrodes and said work, respectively, through separate lead circuits containing means for varying the relative value of reactance in said lead circuits, the improvement which comprises; striking an arc between each of said electrodes and the work; varying the relative value of reactance in said lead circuits to provide an adjustment at which the leading arc current leads the trailing arc current by that angle, less than 140° and more than 60°, whereby said trailing arc exhibits the optimum predominately leading position in the direction of the weld over the greatest portion of the trailing arc current cycle; independently and continuously supplying weld metal to each of said arcs as metal is fused thereby; coordinating relative movement between said arcs and the work with the rate of fusion; and independently controlling the voltage of each of said arcs to maintain each of said arc voltages at a predetermined substantially constant value.

6. In the method of electric arc welding metal work employing two relatively movable metal fusing and depositing electrodes feeding in tandem into a common weld zone on the work, wherein said electrodes and work are energized by a single three-phase power source supplied to said electrodes and said work, respectively, through separate lead circuits containing means for varying the relative value of reactance in said lead circuits, the improvement which comprises; striking an arc between each of said electrodes and the work; adjusting said lead circuit variable relative reactance means to provide a setting at which said trailing arc exhibits the optimum predominately leading position in the direction of the weld over the greatest portion of the trailing arc current cycle; independently and continuously supplying weld metal to each of said arcs as metal is fused thereby; coordinating relative movement between said arcs and the work with the rate of fusion; and independently controlling the voltage of each of said arcs to maintain each of said arc voltages at a predetermined substantially constant value.

7. The method of electric arc welding metal work which comprises maintaining two relatively movable metal fusing and depositing electrodes feeding in tandem into a common weld zone on the work; energizing said electrodes and work from a single three-phase power source supplied to said electrodes and said work, respectively, through separate lead circuits containing a variable reactance in at least one of said lead circuits; striking an arc between each of said electrodes and the work; by varying said line reactance, adjusting the magnitude of and phase angle between the leading and trailing arc currents to provide a trailing arc having the greatest leading position in the direction of the weld over the greatest portion of the trailing arc current cycle; independently and continuously supplying weld metal to each of said arcs as metal is fused thereby; coordinating relative movement between said arcs and the work with the rate of fusion; and independently controlling the voltage of each of said arcs to maintain each of said arc voltages at a predetermined substantially constant value.

NORMAN G. SCHREINER.
EDWIN A. CLAPP.

References Cited in the file of this patent

UNITED STATES PATENTS

| Number | Name | Date |
|---|---|---|
| 1,707,036 | Zack | Mar. 26, 1929 |
| 1,942,047 | Catlett | Jan. 2, 1934 |
| 2,335,399 | Efraimovitch | Nov. 30, 1943 |
| 2,436,387 | Harter et al. | Feb. 24, 1948 |